Aug. 30, 1927.
J. RIHOSEK ET AL
1,640,905
SINGLE CHAMBER AIR PRESSURE BRAKE
Filed April 5, 1926
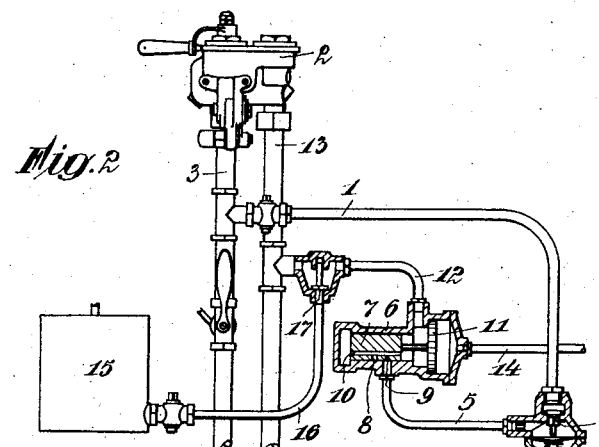
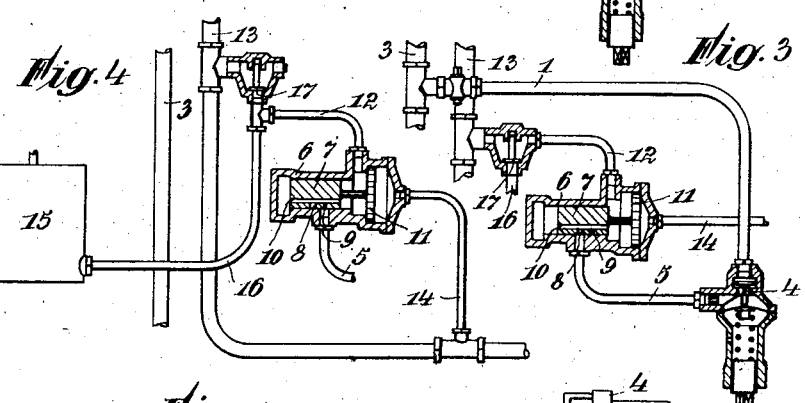
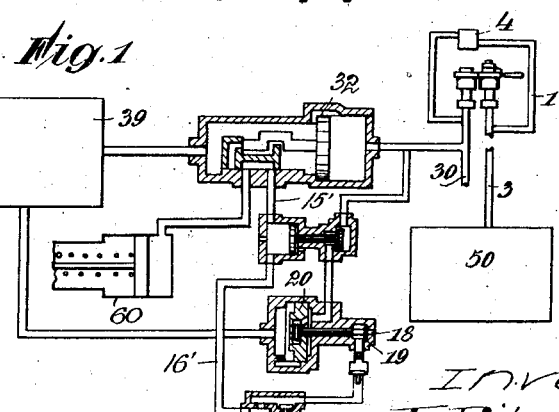
Inventors
J. Rihosek.
R. L. Leuchter.
by
Langner, Parry, Card & Langner
Atty's.

Patented Aug. 30, 1927.

1,640,905

UNITED STATES PATENT OFFICE.

JOHANN RIHOSEK, OF VIENNA, AND RICHARD LUDWIG LEUCHTER, OF WEIDLINGAU-HADERSDORF, AUSTRIA, ASSIGNORS OF ONE-HALF TO THE FIRM GEBRUEDER HARDY, MASCHINENFABRIK UND GIESSEREI, A. G., OF VIENNA, AUSTRIA.

SINGLE-CHAMBER AIR-PRESSURE BRAKE.

Application filed April 5, 1926, Serial No. 99,964, and in Austria December 15, 1925.

Single chamber air pressure brakes in which the application and the release of the brakes is effected step by step are open to the objection that owing to the inevitable leakages an unintentional increase of the brake pressure takes place after an application of the brakes or an unintentional reduction of the air pressure takes place in the train pipe and in the auxiliary reservoir after releasing steps.

In order to avoid this inconvenience we provide according to our invention a pipe connection including a pressure governing device connecting the main air reservoir and the train pipe through which connection additional air under pressure is permitted to flow slowly during the step by step release of the brakes into the train pipe or also into the auxiliary reservoirs until a predetermined pressure is reached. Thereby not only the losses in braking pressure due to leakages are compensated for, but also braking pressure is accumulated so that an exhaustion of the brake plant is avoided.

But for securing an unobjectionable operation of brakes the flow of additional air under pressure or after flow from the main reservoir into the train pipe and the auxiliary reservoirs should be slow after a step of applying the brakes and more rapid after a step of releasing the brake.

This is arrived at according to the present invention by interposing into the pipe connection between the main reservoir and the train pipe a throttling device the adjustment of which is dependent on the pressures in the train pipe, the equalizing reservoir and the auxiliary reservoirs.

A further part of the invention which is more particularly designed for rapidly initiating brake applying steps after brake releasing steps consists in providing an automatic valve in the pipe connection connecting the equalizing reservoir of the engineer's valve with the train pipe.

Fig. 1 of the drawing shows diagrammatically a constructional form of a known brake apparatus, in release position with the present invention applied thereto.

Figs. 2 and 3 show another constructional form of the present invention in two different positions.

Fig. 2 showing the same in the course of an aplication step and

Fig. 3 in the course of a release step.

Fig. 4 shows a modified construction of the controlling mechanism for the throttling device.

After a release step the parts occupy the position shown in Fig. 1 in which the auxiliary reservoir 39 communicates with the train pipe 30 by means of the replenishing groove 32.

The brake release valve is in its closed position in which the escape opening 18 is closed by the valve 19 so that the air under pressure still present in the brake cylinder cannot escape and thus the brake is kept applied. The brake handle of the engineer's valve on the locomotive is in the closed position in which neither air under pressure can escape from the train pipe nor air under pressure can enter the train pipe from the main reservoir 50.

As usual the brake cylinder 60 is connected by a pipe 28 to the brake control valve which in turn is connected to a branch pipe 30. When for releasing the brake, the brake control valve established communication between the pipe 38 and the pipes 15' 16' leading to the valves 19, the air under pressure escapes from the brake cylinder through the pipes 38, 15', 16' and the valves 19 in the well known manner.

Now according to this invention a branch pipe connection 1 is provided which connects the main reservoir 50 or the pipe 3 leading from this reservoir to the engineer's valve with the train pipe 30. In this pipe a pressure reducing valve 4 is provided.

By this arrangement it is possible to gradually raise the presure in the train pipe and in the auxiliary reservoir up to 4 atmospheres after a releasing step, since whenever the pressure is reduced below this adjusted pressure limit air under pressure slowly flows from the main reservoir into the train pipe and the auxiliary reservoir through the pressure reducing valve 4. This after flow of air under pressure is slowed down to such an extent that the pressure on the opposite sides of the piston 20 of the brake release valve increases almost simultaneously so that this valve is not reversed and the escape opening 18 is kept closed.

This construction results in a practically inexhaustible brake since, as above stated, not only any losses in brake pressure are continuously compensated for, but also the auxiliary reservoirs are continuously replenished and there an accumulation of brake pressure is brought about.

In the constructional form shown in Figs. 2 and 3 to a pipe 1 leads from the pipe 3 connecting the engineer's valve 2 with the main reservoir to a pressure reducing valve 4. From this pressure reducing valve 4 a pipe 5 leads to the valve seat in the casing 6 at a piston slide valve 7. The slide valve 7 is provided with two transverse ports 8 and 9 differing in transverse section which lead to a longitudinal bore 10 extending over the entire length of the piston valve body.

Into the space between the slide valve body 7 and its piston 11 leads a pipe 12 connected to the pipe 13 leading from the engineer's valve to the train pipe. That space of the casing 6 which is located on the opposite side of the piston 11 is connected by a pipe 14 with the auxiliary reservoir of the locomotive. A connecting pipe 16 leads from the equalizing reservoir 15 of the engineer's valve to the pipe 12 and into this connecting pipe is provided an automatic valve 17 opening whenever the pressure in the equalizing reservoir exceeds that on the opposite side of this valve.

When an application of the brakes is initiated and the pressure in the train pipe is reduced, the pressure on the left hand side of the piston 11 is likewise reduced and the slide valve 7 is moved into the position shown in Fig. 2 owing to the excess of pressure in the auxiliary reservoir of the locomotive in which position the smaller port 9 comes opposite the end of the pipe 5 in the slide valve seat. Therefore the after flow of the air under pressure from the main reservoir can be only so slow as to compensate for the leakage in the train pipe.

But when a release of the brakes is initiated the parts come into the position shown in Fig. 3 in which the piston 11 of the throttling slide valve is moved to the right and the port 8 of larger transverse area comes opposite the end of the pipe 5 in the slide valve seat. Therefore a reduction of the pressure in the train pipe and in the auxiliary reservoir following the release step will be rapidly compensated for by air under pressure flowing from the main reservoir and the port 8 and thereby the inexhaustibility of the brake is secured.

An excess of pressure in the equalizing reservoir 15 immediately opens the automatic valve 17 so that the pressure is rapidly reduced to that in the train pipe and the retardation of brake application steps which may have to be initiated after a brake release step is avoided which retardation is due to an excess of pressure in the equalizing reservoir.

In the constructional form shown in Fig. 4 the throttling device is controlled by the difference of pressures in the equalizing reservoir 15 and in the train pipe such difference of pressures acting on the piston 11. For this purpose the pipe 12 leading from the left hand side of the piston 11 is directly connected to the pipe 16 leading from the automatic valve 17 to the equalizing reservoir, while the pipe 14 from the right hand side of the piston 11 is connected with the train pipe 13.

As variations of pressure first take place in the equalizing reservoir 15 and thereafter reach the train pipe, only one controlling force operates at any given time on the piston 11 of the throttling device.

What we claim is:

1. In a single chamber air pressure brake a combination of a main reservoir, a train pipe, an engineer's valve connected to the train pipe, a connecting pipe connecting the said main reservoir with the train pipe, a pressure governing device including in the said connecting pipe such pressure controlling device being adapted to establish communication between the main reservoir and the train pipe until a predetermined pressure is reached in the train pipe, and means adapted to locally increase and reduce the free passage area of such connecting pipe and responding to an increase and reduction respectively of the pressure in the train pipe.

2. In a single chamber air pressure brake, the combination of a main reservoir, a train pipe, an engineer's valve connected to the train pipe, a connecting pipe connecting the said main reservoir with the train pipe, a pressure governing device included in the said connecting pipe such pressure controlling device being adapted to establish communication between the main reservoir and the train pipe until a predetermined pressure is reached in the train pipe, a slide valve interposed in the said connecting pipe and having two ports differing in area and adapted to establish communication between the said pressure governing device and the train pipe and means responding to variations of the pressure in the train pipe for actuating the said slide valve.

3. In a single chamber air pressure brake the combination of a main reservoir, a train pipe, an engineer's valve connected to the train pipe, a connecting pipe connecting the said main reservoir with the train pipe, a pressure governing device included in the said connecting pipe such pressure controlling device being adapted to establish communication between the main reservoir and the train pipe until a predetermined pressure is reached in the train pipe, an equalizing reservoir connected to the said engineer's valve and to the train pipe, an automatic valve provided in the connection between the equalizing reservoir and the train and adapted to open whenever the pressure in the equalizing reservoir exceeds that in the train pipe and means adapted to locally increase and reduce the free passage area of such connecting pipe and responding to an increase and reduction respectively of the pressure in the train pipe.

4. In a single chamber air pressure brake the combination of a main reservoir, a train pipe, an engineer's valve connected to the train pipe, a connecting pipe connecting the said main reservoir with the train pipe, a pressure governing device included in the said connecting pipe, such pressure controlling device being adapted to establish communication between the main reservoir and the train pipe until a predetermined pressure is reached in the train pipe, an equalizing reservoir connected to the said engineer's valve and to the train pipe, an automatic valve provided in the connection between the equalizing reservoir and the train and adapted to open whenever the pressure in the equalizing reservoir exceeds that in the train pipe, a slide valve interposed in the said connecting pipe and having two ports differing in area and adapted to establish communication between the said pressure governing device and the train pipe and means comprising a cylinder and a piston for actuating the said slide valve and a permanently open communication between the space of the said cylinder on one side of the said piston and permanently open communication between the space of the cylinder on the opposite side of the piston and a part of the piping of the brake other than the train pipe.

5. In a single chamber air pressure brake the combination of a main reservoir, a train pipe, an engineer's valve connected to the train pipe, a connecting pipe connecting the said main reservoir with the train pipe, a pressure governing device included in the said connecting pipe such pressure controlling device being adapted to establish communication between the main reservoir and the train pipe until a predetermined pressure is reached in the train pipe an equalizing reservoir connected to the said engineer's valve and to the train pipe, an automatic valve provided in the connection between the equalizing reservoir and the train and adapted to open whenever the pressure in the equalizing reservoir exceeds that in the train pipe, a slide valve interposed in the said connecting pipe and having two ports differing in area and adapted to establish communication between the said pressure governing device and the train pipe and means comprising a cylinder and a piston for actuating the said slide valve and a permanently open communication between the space of the said cylinder on one side of the said piston and permanently open communication between the space of the cylinder on the opposite side of the piston and the said equalizing reservoir.

In testimony whereof we have signed our names to this specification.

JOHANN RIHOSEK.
RICHARD LUDWIG LEUCHTER.